United States Patent Office 3,064,002
Patented Nov. 13, 1962

3,064,002
SEPARATION OF PYRIDINE HOMOLOGUES
Raymond N. Fleck, Whittier, and Carlyle G. Wight, Fullerton, Calif., assignors to Union Oil Company of California, Los Angeles, Calif., a corporation of California
No Drawing. Filed July 21, 1958, Ser. No. 749,587
9 Claims. (Cl. 260—290)

This invention relates to the separation of pyridine homologues and in particular concerns an improved process for separating 2,6-lutidine from beta- and gamma-picoline.

In the refining of crude mixtures of nitrogen-base compounds which are recovered from coal tar or from petroleum-derived nitrogenous stocks there is obtained an easily separable fraction that boils between about 140° C. and about 148° C. This 140° C.–148° C. cut is composed of about equal parts of beta-picoline (B.P. 144.0° C.), gamma-picoline (B.P. 144.6° C.), and 2,6-lutidine (B.P. 144.4° C). These pyridine homologues are useful products of considerable commercial interest as intermediates in the preparation of pharmaceutical products, dyes, germicides, vitamins, agricultural chemicals and the like. However, since the boiling points of these three pyridine homologues are so close together, it is not feasible to separate them by fractional distillation, and other methods of separation, e.g., chemical alteration of the components, fractional crystallization, etc., have proven unsatisfactory from the standpoint of purity, economical operation and efficiency of recovery.

The present invention is based on our discovery that certain adsorbents of the molecular sieve type are selective with respect to beta- and gamma-picoline. More particularly, we have found that 2,6-lutidine can be separated from a mixture comprising the same and beta- and gamma-picoline by a process which comprises: contacting the mixture in either liquid or vapor phase with a lean type X (an arbitrary designation for the present class of zeolites which are hereinafter more fully described, and which are described in complete detail as "zeolite X" in British Patent 777,233) molecular sieve adsorbent to obtain a rich adsorbent containing the picoline components of the feed mixture and an unadsorbed phase enriched in the lutidine component; separating the rich adsorbent from the non-adsorbed phase; and treating the rich adsorbent to desorb the picolines therefrom and return the adsorbent to a lean state for reuse in the next succeeding cycle of operation.

Considering now the process of the invention in further detail, it is generally applicable to the binary or ternary mixtures of 2,6-lutidine with beta-picoline and gamma-picoline. The process of our invention is advantageously applied to separating a 2,6-lutidine product and a picoline product from heterocyclic nitrogen base mixtures obtained from coke oven distillates, but these mixtures may also be derived from petroleum, tar sand, oil shale, bone oils, and other natural as well as synthetic sources of these nitrogen base mixtures. The ternary nitrogenous base mixtures normally contain 20–50 percent gamma-picoline, 30–60 percent beta-picoline, and 10–40 percent 2,6-lutidine, although binary mixtures also occur usually comprising 20–80 percent 2,6-lutidine with 20–80 percent gamma- or beta-picoline.

The adsorbent employed in the present process is a type X molecular sieve having a pore size between about 7 A. and about 12 A., such as is described in British Patent No. 777,233. As a class, molecular sieve adsorbents are crystalline partially dehydrated zeolitic metallo alumino silicates having pores of substantially uniform diameter which may vary from as small as about 3 A. to about 15 A., or greater, depending upon the identity and proportion of the component elements. Of these materials there are two principal types, the so-called "type A" and "type X," which differ in their X-ray diffraction patterns, apparent densities, and other characteristics. Our use of "type X" is meant to define those metallo alumino silicates whose compositions and X-ray powder diffraction patterns are substantially the same as those attributed to "zeolite X" in British Patent 777,233. Both types have been used to separate substances of different molecular size and shape, and it is generally considered that the adsorptive selectivity of molecular sieves is due to their containing uniform pores whose diameter is of molecular magnitude. Thus, the ability of a molecular sieve whose pore diameter is about 5 A. to separate straight-chain paraffins from branched-chain paraffins is considered to be due to the fact that the minimum molecular dimension of the straight-chain paraffins is somewhat less than 5 A., whereas that of the branched-chain paraffins is somewhat greater than 5 A. Consequently, the smaller straight-chain molecules can enter and be held in the pores of the 5 A. sieve, whereas the branched-chain molecules are too large to enter pores of such small size. In the present process, however, the adsorbent cannot operate in such manner since the pore size is greater than the minimum molecular dimension of any of the pyridine homologues present in the feed stream. On the other hand it does not operate as a conventional adsorbent or even as would be expected from the teachings of the aforesaid British Patent No. 777,233. The latter clearly teaches (1) that the type X molecular sieves preferentially adsorb polar, polarizable and unsaturated molecules and reject non-polar and saturated molecules; and (2) that increased preferential adsorption is shown for compounds of increasing boiling point. From such teaching it would be expected that there would be essentially no preference shown for beta-picoline, gamma-picoline, or 2,6-lutidine. In fact, based on the preference of conventional adsorbents, i.e., silica gel, activated carbon, etc., for materials of higher molecular weight, one might exject 2,6-lutidine (M.W. 107.2) to be adsorbed in preference to beta- and gamma-picoline (M.W. 93.1). As is hereinafter shown, however, we have found that in the present process the beta- and gamma-picolines are unexpectedly adsorbed in preference to 2,6-lutidine.

As stated, the adsorbents which are employed in accordance with the invention are type X zeolitic partially dehydrated metallo alumino silicates having pores of a substantially uniform diameter between about 7 A. and about 12 A. Certain naturally occurring minerals can be heated to dehydrate the molecule and obtain an activated zeolitic adsorbent of such type. However, we greatly prefer the synthetic materials which are conveniently prepared by heating stoichiometric quantities of alumina and silica with an excess of sodium hydroxide and thereafter washing out the excess caustic to obtain a type X zeolitic sodium alumino silicate having the approximate molecular structure of $[6Na_2O \cdot 6Al_2O_3 \cdot 15SiO_2]$ on a water-free basis, and having a uniform pore diameter of about 13 A. The uniform pore diameter of this product can be altered by exchanging part of the sodium cation with other metals. For example, such product can be treated with a concentrated solution of a calcium salt, e.g., calcium chloride, at superatmospheric pressure and at 20°–175° C., washed with water to remove excess calcium chloride, and thereafter partially dehydrated by heating to obtain a type X calcium sodium alumino silicate having a pore diameter of about 10 A. and having an average molecular structure on a water-free basis corresponding to $$[6CaO \cdot 6Al_2O_3 \cdot 15SiO_2]_{0.9}$$

$[6Na_2O \cdot 6Al_2O_3 \cdot 15SiO_2]_{0.1}$. Other divalent cations such as magnesium, strontium, and barium may be employed instead of calcium. Further details regarding the properties and preparation of type X molecular sieves are to be found in British Patent No. 777,233. While any type X molecular sieve having a pore diameter between about 7 A. and about 12A. may be employed in accordance with the invention, it is preferred to use the 10 A. calcium sodium alumino silicate referred to above. This particular product is available commercially under the trade name "Molecular Sieves 10X." The sodium salt described above is also available under the trade name "Molecular Sieves 13X." These commercial materials may contain substantial amounts of inert binder materials.

The optimum particle size of the adsorbent will depend upon the manner in which it is used in the process, i.e., as a fixed compact bed, a fluidized bed, etc., but is usually between about 2 and about 400 mesh, preferably between about 4 and about 30 mesh for fixed and moving compact beds and between about 100 and about 300 mesh for fluidized beds.

The adsorbent is preferably employed in the form of a dense compact fixed or moving bed which is alternately contacted with the feed and then desorbed. In the simplest embodiment of the invention, the adsorbent is employed in the form of a single static bed, in which case the process is only semi-continuous. Preferably, a set of two or more static beds is employed in fixed-bed contacting with appropriate valving so that the feed stream is passed through one or more adsorbent beds while the desorption is carried out in one or more of the other beds in the set. The direction of flow during adsorption and desorption may be either up or down through the adsorbent, but preferably the adsorption is carried out in one flow direction and the desorption in the other. Any of the conventional apparatus employed in static bed fluid-solids contacting may be used. A moving compact bed of adsorbent has a much greater separation efficiency than a fixed compact bed of the same size because of the ability of the former to provide reflux. The moving compact bed is therefore preferable when an extremely high degree of separation is desired or when the feed mixture separation factor is poor.

As previously stated, the nitrogen base mixture is contacted with the adsorbent in either the vapor or liquid phase. The pressure is usually near atmospheric but may be either subatmospheric or superatmospheric. In general the adsorption is carried out at a temperature below that temperature where the feed mixture decomposes, preferably between about 35° C. and about 250° C., and at pressures between about atmospheric and about 1,000 p.s.i.g., preferably between about 0 p.s.i.g. and 100 p.s.i.g. The immediate products of the initial adsorption stage are: (1) an unadsorbed phase which is rich in the lutidine components of the feed mixture and lean in picolines; and (2) a solid rich adsorbent containing adsorbed picolines and lean in lutidine. The solid and unadsorbed phases are separated and the latter is passed to storage as the purified lutidine product of the process. The rich adsorbent, on the other hand, is treated to desorb the picolines therefrom and to return it to a lean state for reuse. According to one mode of operation, such treatment merely comprises subjecting the rich adsorbent to an elevated temperature and/or a reduced pressure. The use of elevated temperatures may also be combined with the use of a stripping gas in the known manner.

In accordance with a preferred mode of operation the rich adsorbent is treated with a suitable displacement exchange fluid at approximately the same temperature as that employed in the initial adsorption stage. The displacement exchange fluid may be any material which is inert with respect to the adsorption of the feed mixture, which is adsorbable by the adsorbent and which is readily separated from the components of the feed mixture by distillation, absorption, or other conventional means. Preferably the displacement exchange fluid is one which has a boiling point substantially outside the boiling range of the feed mixture and has an adsorbability substantially the same as that of the adsorbed components of the feed mixture. Preferred displacement exchange fluids are methylamine, ethylamine, propyl amine, butylamine, amyl amine, hexyl amine, morpholine, n-methyl morpholine, pyridine, and other amines boiling sufficiently below the feed mixture to make them easily separable from both the adsorbed and unadsorbed phases by distillation.

The following experimental examples, in which percentages are by volume, specifically illustrate the practice of the invention.

Example I

A five volume mixture comprising 46 percent gamma-picoline and 54 percent 2,6-lutidine is circulated for a period of 60 minutes through a lean "Molecular Sieves 10X" (zeolitic calcium sodium alumino silicate) adsorbent bed at about 200° C. and one atmosphere pressure. The unadsorbed fraction of 2.6 volumes contains 95 percent 2,6-lutidine and 5 percent gamma-picoline. The rich adsorbent is then stripped with pyridine at about 200° C. and one atmosphere to produce an adsorbate fraction rich in gamma-picoline.

Example II

Another five volume mixture comprising 27 percent beta-picoline, 28 percent gamma-picoline, and 45 percent 2,6-lutidine is circulated for a period of 60 minutes through a lean "Molecular Sieves 10X" adsorbent bed at about 200° C. and one atmosphere pressure. A 2.5 volume unadsorbed phase contains 94 percent 2,6-lutidine, 3 percent beta-picoline, and 3 percent gamma-picoline. The rich adsorbent is stripped with amyl amine at about 200° C. and one atmosphere pressure to produce an adsorbate fraction rich in beta- and gamma-picoline.

Example III

A five volume mixture comprising 46 percent gamma-picoline and 54 percent 2,6-lutidine is dissolved in iso-octane and is circulated in liquid phase for a period of 60 minutes through a lean "Molecular Sieves 10X" adsorbent bed at about 90° C. and one atmosphere pressure. The unadsorbed fraction, on an iso-octane-free basis, has essentially the same analysis as the unadsorbed fraction in Example I.

Example IV

This run, conducted in the same manner and with the same feed as Example I, except that a pressure of 70 p.s.i.g. is maintained during adsorption and stripping, yields substantially the same lutidine-picoline separation as shown in Example I.

Example V

In another run, a type X strontium sodium alumina silicate is substituted for the "Molecular Sieves 10X" (calcium sodium alumino silicate) in an experiment conducted in the same manner and with the same feed as Example II. The 2,6-lutidine is separated from the beta- and gamma-picoline in substantially the same manner as shown in Example II.

Although the deactivation of the adsorbent is gradual, some deactivation may eventually occur. It is within the scope of this invention to reactivate the silicate adsorbent by high temperature contacting with a hot reactivating gas such as flue gas, air, etc.

As will be apparent, the process of the invention essentially comprises solids-fluid contacting operations, and any of the various techniques and equipment conventionally applied to such type of operation may be adapted to the practice of the invention without departing from the scope thereof. Thus, while it is often preferred to maintain the adsorbent in the form of a moving bed, i.e., as a solids-fluid contacting operation in which a compact bed of the adsorbent is passed successively through adsorption and desorption zones where it is concurrently or countercurrently contacted with the feed stream and the displacement exchange fluid, respectively, the process is nevertheless operable in the form of a fixed compact bed. Also, the solids-fluid contacting operation may be carried out employing fluidized techniques whereby the adsorbent is employed in relatively small particle size and is suspended by the flow of the fluid with which it is contacted.

Other modifications and adaptations which would occur to one skilled in this particular art are to be included in the spirit and scope of this invention as defined by the following claims.

We claim:

1. A process for separating 2,6-lutidine from a mixture comprising 2,6-lutidine and at least one picoline boiling between about 140° C. and about 148° C., which comprises: (1) contacting said mixture with a lean granular adsorbent comprising a partially dehydrated type X crystalline zeolitic metallo alumino silicate having pores of substantially uniform diameter between about 7 A. and about 12 A., whereby there is obtained a rich adsorbent containing adsorbed picoline and a raffinate product which is rich in 2,6-lutidine; (2) separating said raffinate product from said rich adsorbent; and (3) treating said rich adsorbent to recover the adsorbed picoline therefrom.

2. A process according to claim 1 wherein the said adsorbent comprises a type X partially dehydrated crystalline zeolitic calcium sodium alumino silicate having substantially uniform diameter pores of about 10 A.

3. A process as defined by claim 1 wherein, in step (3), the rich adsorbent is contacted with a displacement exchange fluid to obtain an extract product comprising desorbed picoline and said displacement exchange fluid, and said extract product is treated to separate said displacement exchange fluid therefrom.

4. A process for separating 2,6-lutidine from a mixture comprising 2,6-lutidine and at least one picoline boiling within the range of about 140° C. to about 148° C., which process comprises: (1) contacting said mixture with a lean granular adsorbent comprising a partially dehydrated type X crystalline zeolitic calcium sodium alumino silicate having substantially uniform diameter pores of about 10 A., said contacting being effected at a temperature between about 35° C. and about 250° C. and at a pressure between about 0 p.s.i.g. and about 100 p.s.i.g., whereby there is obtained a rich adsorbent containing adsorbed picoline components of said mixture and a raffinate product which is rich in 2,6-lutidine; (2) separating said raffinate product from said rich adsorbent; and (3) treating said rich adsorbent to desorb the adsorbed picoline therefrom.

5. A process as defined by claim 4 wherein, in step (3), the rich adsorbent is contacted with a displacement exchange fluid to obtain an extract product comprising desorbed picoline and said displacement exchange fluid, and said extract product is treated to separate said displacement exchange fluid therefrom.

6. A process according to claim 5 wherein the said displacement exchange fluid is pyridine.

7. A process according to claim 5 wherein the said displacement exchange fluid is an amine boiling sufficiently below the feed mixture so that said amine is easily separable from both said picoline and said 2,6-lutidine by distillation.

8. A process according to claim 5 wherein step (1) and step (3) are carried out at substantially the same temperature and pressure.

9. A process for separating 2,6-lutidine from a mixture comprising 2,6-lutidine, beta-picoline, and gamma-picoline, which comprises: (1) contacting said mixture in the vapor phase with a lean granular adsorbent comprising a partially dehydrated type X crystalline zeolitic calcium sodium alumino silicate having substantially uniform diameter pores of about 10 A., said contacting being effected at a pressure between about 0 p.s.i.g. and about 100 p.s.i.g. whereby there is obtained a rich adsorbent containing adsorbed beta-picoline and gamma-picoline and a raffinate product which is rich in 2,6-lutidine; (2) separating said raffinate product from said rich adsorbent; (3) contacting said rich adsorbent with pyridine to obtain an extract product comprising beta-picoline, gamma-picoline and pyridine; and (4) treating said extract product to separate pyridine therefrom.

References Cited in the file of this patent

UNITED STATES PATENTS

| 2,291,419 | Strickland | July 28, 1942 |
| 2,606,143 | Smith et al. | Aug. 5, 1952 |
| 2,763,603 | Skinner | Sept. 18, 1956 |

FOREIGN PATENTS

| 777,232 | Great Britain | June 19, 1957 |
| 777,233 | Great Britain | June 19, 1957 |

OTHER REFERENCES

Greene-Kelly, Trans. Faraday Soc., vol. 51, pages 412–24 (1955).

Trefny et al., German application, Serial No. C7435, printed Sept. 27, 1956 (K 12, p. 1).